(12) United States Patent
Welchman et al.

(10) Patent No.: US 8,645,912 B2
(45) Date of Patent: Feb. 4, 2014

(54) SYSTEM AND METHOD FOR USE IN REPLAYING SOFTWARE APPLICATION EVENTS

(75) Inventors: Dan Welchman, Ely (GB); Phillip James Robinson, Ely (GB)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 12/872,336

(22) Filed: Aug. 31, 2010

(65) Prior Publication Data

US 2012/0054715 A1 Mar. 1, 2012

(51) Int. Cl.
*G06F 3/048* (2013.01)

(52) U.S. Cl.
USPC ........... 717/106; 717/126; 717/114; 717/108; 717/134; 719/328; 719/313; 715/841; 715/704

(58) Field of Classification Search
USPC ................. 717/106, 126, 114, 129, 134, 118; 715/841
See application file for complete search history.

(56) References Cited

U.S. PATENT DOCUMENTS

| | | | |
|---|---|---|---|
| 5,446,838 A | 8/1995 | Kimelman | |
| 5,448,739 A * | 9/1995 | Jacobson | 719/320 |
| 5,659,679 A | 8/1997 | Alpert et al. | |
| 6,079,032 A | 6/2000 | Peri | |
| 6,223,144 B1 | 4/2001 | Barnett et al. | |
| 6,356,858 B1 | 3/2002 | Malka et al. | |
| 6,481,008 B1 | 11/2002 | Chaiken et al. | |
| 6,668,372 B1 | 12/2003 | Wu | |
| 6,848,100 B1 | 1/2005 | Wu et al. | |
| 7,292,970 B1 | 11/2007 | Hurlock | |
| 7,296,261 B2 | 11/2007 | Witchel et al. | |
| 7,433,852 B1 * | 10/2008 | Bertrand et al. | 706/45 |
| 7,503,037 B2 | 3/2009 | Banerjee et al. | |
| 7,653,899 B1 | 1/2010 | Lindahl et al. | |
| 2002/0095660 A1 | 7/2002 | O'Brien et al. | |
| 2004/0205720 A1 | 10/2004 | Hundt | |
| 2005/0028036 A1 | 2/2005 | Shibata | |
| 2005/0071818 A1 | 3/2005 | Reissman et al. | |
| 2005/0210452 A1 | 9/2005 | Dimpsey et al. | |
| 2006/0225051 A1 | 10/2006 | Kannan | |
| 2007/0074168 A1 | 3/2007 | Bates et al. | |

(Continued)

FOREIGN PATENT DOCUMENTS

EP 307075 A2 3/1989

OTHER PUBLICATIONS

Search Report and Written Opinion from EP Application No. 11173928.0 dated Nov. 17, 2011.

(Continued)

*Primary Examiner* — Vanel Frenel
(74) *Attorney, Agent, or Firm* — Armstrong Teasdale LLP (57) ABSTRACT

A method for use in replaying actions performed by a user of a software application. An input signal indicating an action performed by the user is received from a user input interface. Computer-executable instructions corresponding to the input signal are executed by a processor. An input event associated with the human-readable statements is stored in a memory device. Application object code corresponding to the human-readable statements may later be executed to replay the input event. In addition, an application state representing one or more variables of the software application may be stored.

20 Claims, 11 Drawing Sheets

(56) References Cited

U.S. PATENT DOCUMENTS

| | | |
|---|---|---|
| 2009/0044177 A1 | 2/2009 | Bates et al. |
| 2009/0144698 A1 | 6/2009 | Fanning et al. |
| 2009/0222786 A1 | 9/2009 | Malcolm |
| 2010/0135472 A1* | 6/2010 | Watanabe et al. .......... 379/88.08 |
| 2010/0153883 A1* | 6/2010 | Lee et al. ...................... 715/841 |
| 2011/0078666 A1* | 3/2011 | Altekar ........................ 717/131 |

OTHER PUBLICATIONS

Search Report and Written Opinion from corresponding EP Application No. 11173987.2-2211 dated Dec. 6, 2011.

Pfahler et al., "Cate: A System for Analysis and Test of Java Card Applications", Workshops on Testing of Component-Based Systems and Softwarequality, XX, XX, pp. 157-163, Oct. 1, 2004.

Wikipedia Contributors, HP WinRunner, May 10, 2010, 2 pages, Wikipedia, The Free Encyclopedia.

\* cited by examiner

| | Event Recorder | | | ✕ |
|---|---|---|---|---|
| ⬤ △ ⊗ | Clear All | Setup ▶ | Assert ▶ | Test Name: simple_trail_test | Generate Test... |
| Step | Item | Type | Data |
| 4 | an sw_action(close) a map_trail(unset) :\|close()\| | :image_button_item | |
| 5 | an sw_action(undo) a map_trail(unset) :\|undo()\| | :image_button_item | |
| 6 | an sw_action(rational_b_spline) a map_trail(unset) :\|rational_b_spline()\| | :image_button_item | |
| 7 | [Trail Point...] an sw_action(points_tool) a map_trail_plugin(map_trail)... | :button_item | |
| 8 | X coordinate: "-8478791.373 m" an sw_action(x_coord) a map_trail_points_tool... | :text_item | -8478791.3... |
| 9 | Y coordinate: "5050785.373 m" an sw_action(y_coord) a map_trail_points_tool... | :text_item | 5050785.3... |
| 10 | [Move Point] an sw_action(move_point) a map_trail_points_tool(points_tool) :\|move_p... | :button_item | |
| 11 | ASSERT Trail Closed?: ("_false") | :assert_trail_closed | "_false" |

```
#% text_encoding = iso8859_1
_package sw

_pragma(classify_level=debug)
simple_trail_test
Test recorded and automatically generated by application_test_recorder
Image:  U:\swdev\streams\images\159\sweo_dm_open.msf def_slotted_exemplar(:simple_trail_test,
{{:app,_unset},{:helper,_unset}},
{ :application_test } }
$ _pragma(classify_level=debug)
_method simple_trail_test_1()
simple_trail_test test_1 (###### Step 1)

Step 2 (SETUP) Set This Trail (5 points) atr_trail_1.xml ######
result <<.helper.step(.helper,:|restore_trail_from_file()|,1)

Step 3 an sw_action(reverse) a map_trail(u nset) :|reverse()| ######
my_image_button_item <<.helper.get_item({{:cu_application,:|Smallworld Electric Office - (No Active
Design)|},3,2,2,1,3,1,1,1,5,:image_button_item})
result <<.helper.step(my_image_button_item,{})
```

FIG. 7B

Step 4 an sw_action(close) a map_trail(unset) :|close()| ######
my_image_button_item << .helper.get_item({{:cu_application,:|Smallworld Electric Office - (No Active Design)|},3,2,2,1,3,1,1,1,4,:image_button_item})
result << .helper.step(my_image_button_item,{})

Step 5 an sw_action(undo) a map_trail(unset) :|undo()| ######
my_image_button_item << .helper.get_item({{:cu_application,:|Smallworld Electric Office - (No Active Design)|},3,2,2,1,3,1,1,1,2,:image_button_item})
result << .helper.step(my_image_button_item,{})

Step 6 an sw_action(rational_b_spline) a map_trail(unset) :|rational_b_spline()| ######
my_image_button_item << .helper.get_item({{:cu_application,:|Smallworld Electric Office - (No Active Design)|},3,2,2,1,3,1,1,1,8,2,6,:image_button_item})
result << .helper.step(my_image_button_item,{})

Step 7 an sw_action(points_tool) a map_trail_plugin(map_trail) :|activate_point_dialog()| ######
my_button_item << .helper.get_item({{:cu_application,:|Smallworld Electric Office - (No Active Design)|},1,4,1,11,:button_item})
result << .helper.step(my_button_item,{})

Step 8 "-8478791.373 m"an sw_action(x_coord) a map_trail_points_tool(points_tool) unset ######

SYSTEM AND METHOD FOR USE IN REPLAYING SOFTWARE APPLICATION EVENTS

BACKGROUND OF THE INVENTION

The subject matter disclosed herein relates generally to software applications and, more specifically, to systems and methods for use in recording and replaying user interactions with a software application.

At least some known computer systems use test code to automatically execute application code based on predefined inputs, such as user interface manipulation, and expected outputs. Furthermore, some known systems record user interface input events by monitoring user interaction with a graphical user interface. For example, known systems may record that a mouse button is pressed with the cursor at a specific location within a window. Recorded events may be later replayed as part of a test script to determine whether the application behaves in an expected manner.

Because at least some known input recording systems focus on input at the level of a user interface, such systems have no access to internal application entities. For example, while user interface elements, such as menus and buttons, may be visible to a known input recording system, generally known systems have no awareness of the control code used to handle events generated by these user interface elements. As a result, test scripts that replay such events are specific to a particular implementation of a user interface. With known systems, when the user interface is modified, or a new user interface (e.g., a touch screen interface or voice-operated interface) is created, user interface events must be re-recorded to create a new test script.

Furthermore, known input recording systems are incapable of reading and writing the variables that compose application state. Accordingly, testing an application feature often requires extensive "setup", or preliminary user interface manipulation, to achieve a desired pre-test application state. Moreover, application behavior can be evaluated based only on information presented via the user interface. Accordingly, known input recording systems may be incapable of validating internal data structures.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a system for use in replaying events initiated by a user of a software application is provided. The system includes a memory device, a user imputer interface, and a processor coupled in communication with the memory device and the user input interface. The memory device is configured to store a plurality of computer-executable instructions. The user input interface is configured to produce an input signal based on an action performed by the user. The processor is programmed to execute one or more computer-executable instructions of the plurality of computer-executable instructions. The one or more computer-executable instructions correspond to the input signal and to one or more human-readable statements. The processor is also programmed to store, in the memory device, an input event associated with the one or more human-readable statements.

In another aspect, a method for use in replaying actions performed by a user of a software application is provided. The method includes receiving from a user input interface an input signal indicating an action performed by the user. One or more computer-executable instructions corresponding to the input signal are executed by a processor. An input event associated with the one or more human-readable statements is stored in a memory device. An application state representing one or more variables of the software application prior to execution of the computer-executable instructions corresponding to the input signal is also stored in the memory device.

In yet another aspect, one or more computer-readable storage media having computer-executable instructions embodied thereon are provided. When executed by at least one processor, the computer-executable instructions cause the at least one processor to receive an input signal indicating an action performed by the user and to execute one or more computer-executable instructions corresponding to the input signal and to one or more human-readable statements. The computer-executable instructions also cause the at least one processor to store an input event associated with the one or more human-readable statements.

BRIEF DESCRIPTION OF THE DRAWINGS

The embodiments described herein may be better understood by referring to the following description in conjunction with the accompanying drawings.

DETAILED DESCRIPTION OF THE INVENTION

The embodiments described herein provide recording and playback of software application events. Specifically, in some embodiments, during execution of an application, an input signal based on a user-initiated action is received. Based on the input signal, a computing device executes application object code corresponding to the input signal and records an input event. The input event may be associated with source code and/or object code and may subsequently be replayed by executing the source code and/or object code.

The input monitoring described herein occurs within the software application. Accordingly, the monitoring system may detect what object code corresponds to (e.g., is executed in response to) an input signal and what source code corresponds to (e.g., was compiled into) the object code. For example, if a button click is associated with a method, a reference to the method may be recorded based on the button click. In some embodiments, source code (e.g., test source code) is generated, including an invocation of the method. Such generated source code may be executed to replay the input event, simulating the user-initiated action.

Further, embodiments described herein have access to application variables, including complex data structures (e.g., object instances). The state or value of one or more variables may be recorded and associated with an input event. For example, a plurality of such variables may be stored as an application state and later applied to an instance of the application to restore the application to the state in which it existed prior to the user-initiated action. Such embodiments enable efficient test setup and reduced test execution time by eliminating multiple steps of pre-test user interface manipulation.

As used herein, the term "application source code" includes human-readable statements describing operations capable of being performed by a computer. A single statement is sometimes referred to as a "line of code" or simply a "line", regardless of the quantity of lines used to represent the human-readable statement in a displayed or printed form. A collection of functionally related statements may be grouped into a method (also known as a function). Related methods may be grouped into a class, and related classes may be grouped into a package or module. An application or a library, for use by an application, may include application source code in multiple packages. Application source code may be stored in one or more files in a memory device. For example, each class may correspond to one file.

Application object code including computer-executable instructions is generated from application source code. For example, application source code may be compiled and/or translated to create application object code. The computer-executable instructions of the application object code correspond to the human-readable statements of the application source code. Unlike human-readable statements, computer-executable instructions are executable directly by a processor of a computer and/or by a "virtual machine" that is executed by such a processor. In addition to human-readable statements, application source code may include content, such as comments, preprocessing directives, and/or annotations, that is not directly generated into application object code for execution by a processor and/or a virtual machine.

Embodiments are described herein with respect to application object code that corresponds to or is associated with an input signal. Such association is generally created by an application developer. For example, an application developer may register a particular method as an "event handler" for button click events related to a button in a graphical user interface. A different method may be specified as the event handler for a mouse-over event related to the button.

Notably, complex software applications often include multiple user interfaces for performing a similar set of functions. For example, a traditional graphical user interface (GUI) may be provided for mouse and keyboard manipulation. In addition, a touch screen interface and/or a voice recognition interface may be provided. While these user interfaces enable different modes of user interaction, they may be configured to invoke the same application object code. Embodiments described herein are capable of detecting and recording input events at this common level of interaction between a user and a software application. Accordingly, such embodiments enable the modification and addition of user interfaces without necessarily requiring modification and addition of associated event playback source code.

In operation, a processor executes a software application by executing application object code. During execution of application object code, the execution of particular object code or the occurrence of a user-generated event may be monitored and/or detected. For example, an execution breakpoint may be associated with (e.g., inserted before) a computer-executable instruction of object code associated with an input signal. The processor halts execution of the application object code at the execution breakpoint, and another application, known as a monitoring utility, becomes aware of the execution of the object code. For example, the processor may be programmed to notify the monitoring utility that the execution breakpoint has been reached, or the monitoring utility may repeatedly request or "poll" for execution information from the processor. The monitoring utility records an input event and directs the processor to continue executing the application object code. In another example, application source code and/or application object code may be modified (e.g., instrumented) to include and/or reference methods provided by a monitoring utility and/or computer-executable statements for generating input events.

An exemplary technical effect of the methods, systems, and apparatus described herein includes at least one of (a) receiving from a user input interface an input signal indicating an action performed by the user; (b) executing by a processor one or more computer-executable instructions corresponding to the input signal; (c) storing in a memory device an input event associated with the one or more human-readable statements; (d) storing in the memory device an application state representing one or more variables of the software application prior to execution of the computer-executable instructions corresponding to the input signal; (e) executing an instance of the software application; (f) applying the stored application state to the instance of the software application; and (g) replaying the action performed by the user based on the stored input event.

Figure 1:
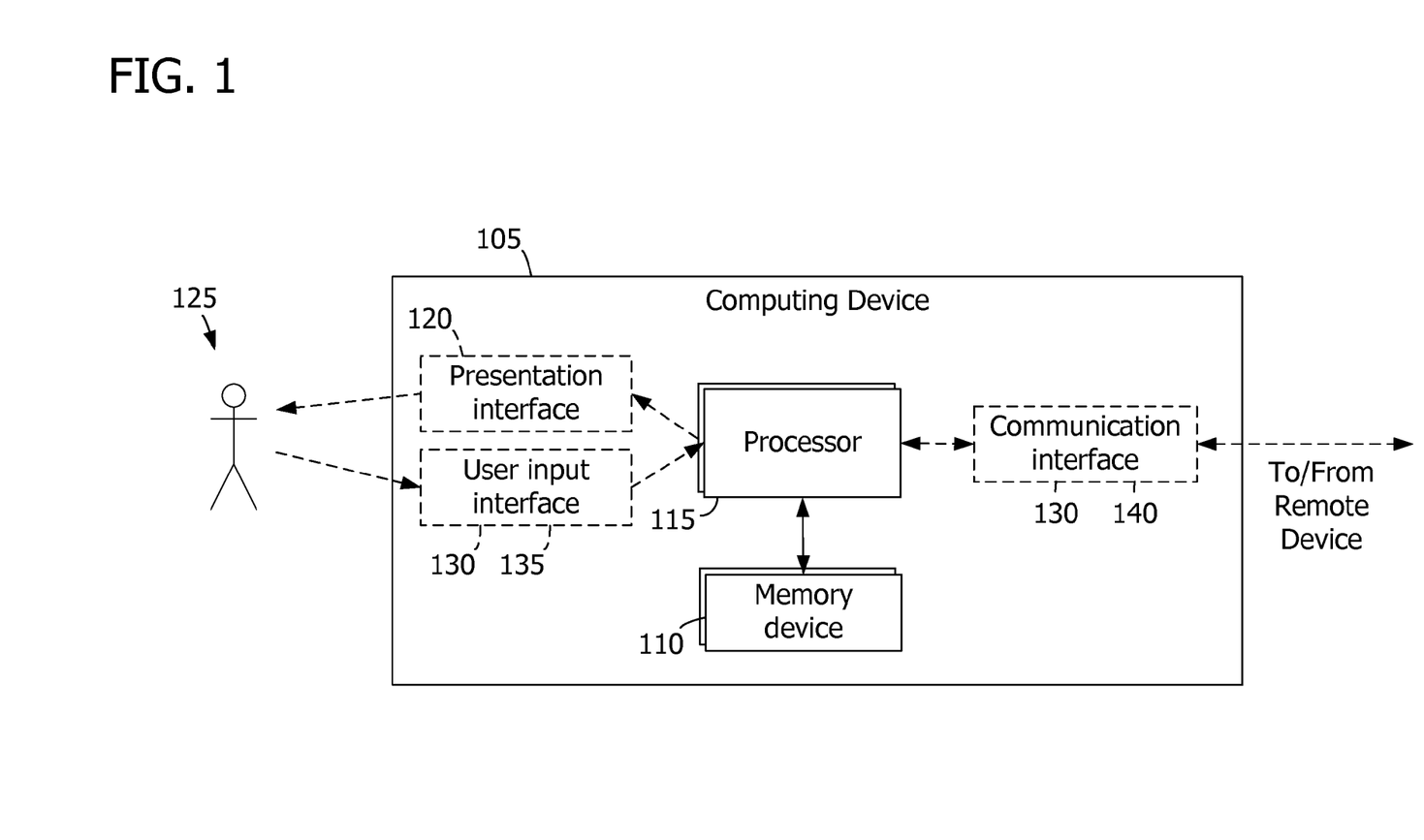
FIG. 1 is a block diagram of an exemplary computing device.

FIG. 1 is a block diagram of an exemplary computing device 105. Computing device 105 includes a memory device 110 and a processor 115 coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

Memory device 110 is one or more devices that enables information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, application source code, application object code, configuration data, input events, application states, assertion statements, validation results, and/or any other type of data.

In some embodiments, computing device 105 includes a presentation interface 120 that is coupled to processor 115. Presentation interface 120 presents information, such as a user interface, application source code, input events, and/or validation results to a user 125. For example, presentation interface 120 may include a display adapter (not shown in FIG. 1) that may be coupled to a display device, such as a cathode ray tube (CRT), a liquid crystal display (LCD), an organic LED (OLED) display, and/or an "electronic ink" display. In some embodiments, presentation interface 120 includes one or more display devices. In addition to, or in the alternative, presentation interface 120 may include an audio output device (e.g., an audio adapter and/or a speaker) and/or a printer.

In some embodiments, computing device 105 includes an input interface 130, such as a user input interface 135 or a communication interface 140. Input interface 130 may be configured to receive any information suitable for use with the methods described herein.

In the exemplary embodiment, user input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). A single component, such as a touch screen, may function as both a display device of presentation interface 120 and user input interface 135.

Communication interface 140 is coupled to processor 115 and is configured to be coupled in communication with one or more remote devices, such as another computing device 105. For example, communication interface 140 may include, without limitation, a wired network adapter, a wireless network adapter, and/or a mobile telecommunications adapter. Communication interface 140 may also transmit data to one or more remote devices. For example, a communication interface 140 of one computing device 105 may transmit an indication of one or more source code portions of interest and/or one or more execution events to the communication interface 140 of another computing device 105.

Figure 2:
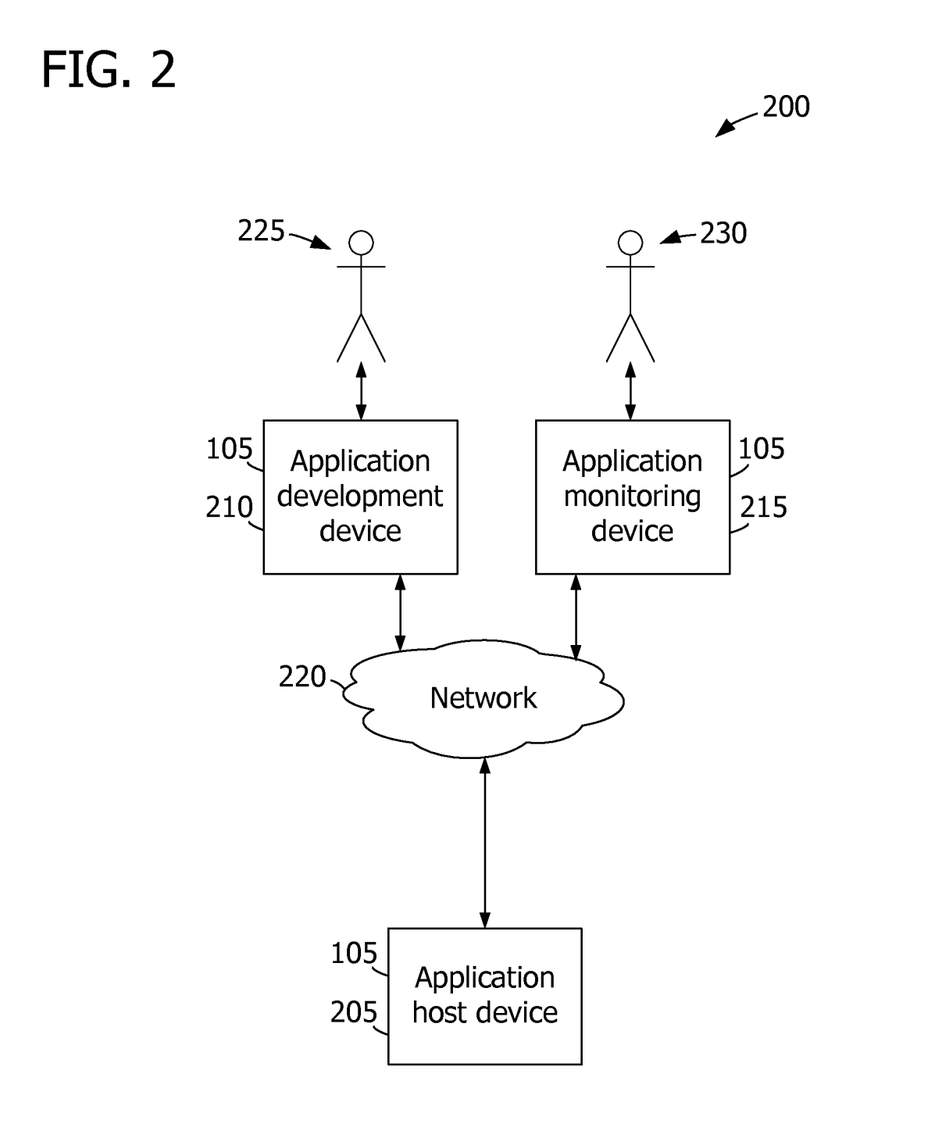
FIG. 2 is block diagram of an exemplary event recording and playback system that includes an application host device, an application development device, and an application monitoring device coupled in communication via a network.

FIG. 2 is block diagram of an exemplary system 200 including an application host device 205, an application development device 210, and an application monitoring device 215 coupled in communication via a network 220. Network 220 may include, without limitation, the Internet, a local area network (LAN), a wide area network (WAN), a wireless LAN (WLAN), a mesh network, and/or a virtual private network (VPN). While certain operations are described below with respect to particular computing devices 105, it is contemplated that any computing device 105 may perform one or more of the described operations. For example, application development device 210 may perform all of the operations below.

Application host device 205, application development device 210, and application monitoring device 215 are computing devices 105 (shown in FIG. 1). In the exemplary embodiment, each computing device 105 is coupled to network 220 via communication interface 140. In an alternative embodiment, application host device 205 is integrated with application development device 210 and/or with application monitoring device 215.

Application development device 210 interacts with an application developer 225 (e.g., via user input interface 135 and/or presentation interface 120). For example, application development device 210 may be configured to receive application source code from application developer 225. Application development device 210 transmits the application source code to application host device 205 via network 220.

Application host device 205 receives and stores the application source code (e.g., in memory device 110). Application host device 205 and/or application development device 210 may be configured to generate application object code based on the application source code.

Application monitoring device 215 interacts with an application user 230 (e.g., via user input interface 135 and/or presentation interface 120). In one embodiment, application monitoring device 215 receives input from application user 230, generates an input event, and transmits the input event to application host device 205. Application host device 205 receives and stores the input event. In one embodiment, application host device 205 generates source code including an invocation of a method associated with the input event.

In some embodiments, application monitoring device 215 is remote to application host device 205. For example, application monitoring device 215 may be located at a facility that is geographically removed from application host device 205 and/or application development device 210.

Figure 3:
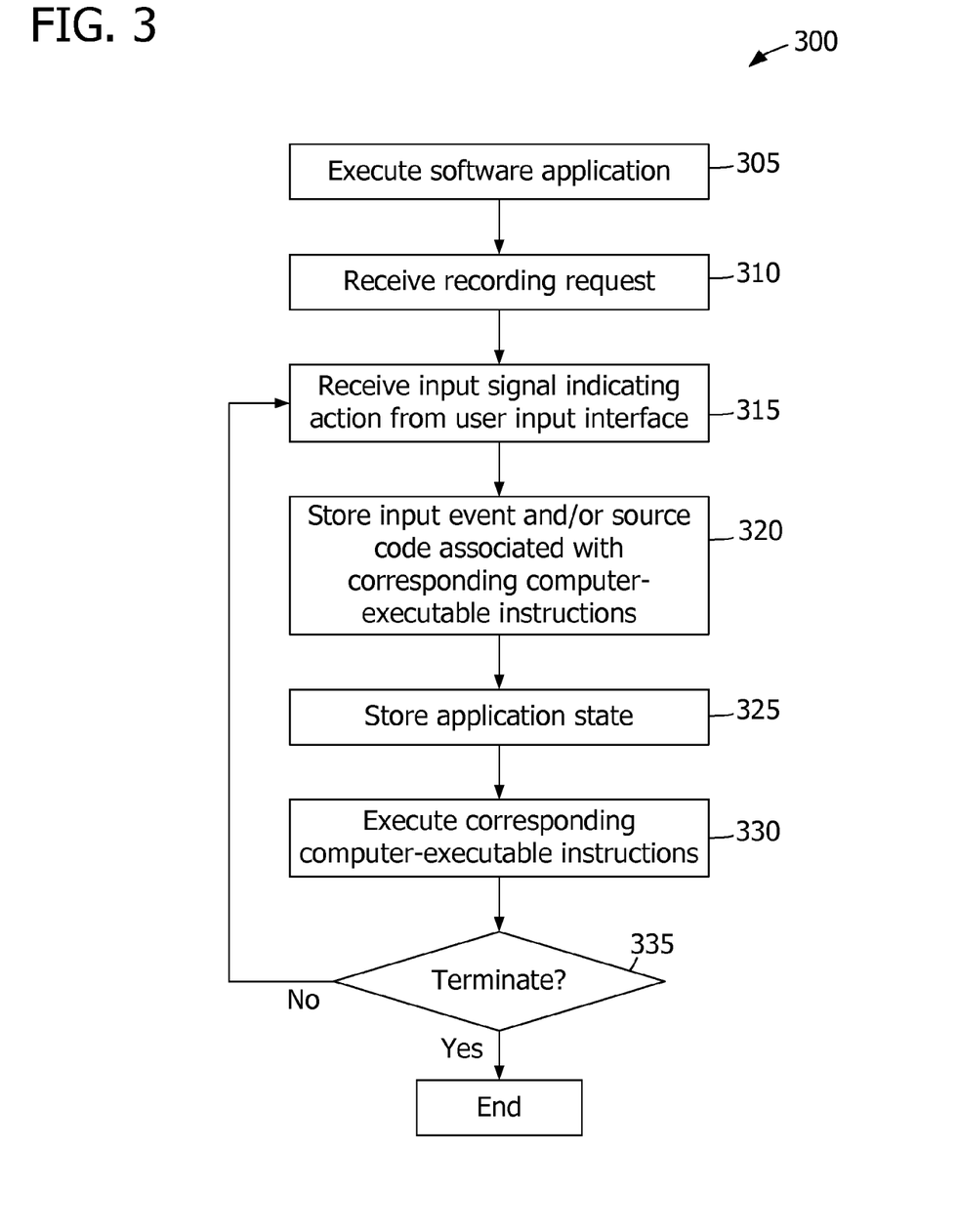
FIG. 3 is a flowchart of an exemplary method for use in replaying actions performed by a user of a software application.
Figure 4:
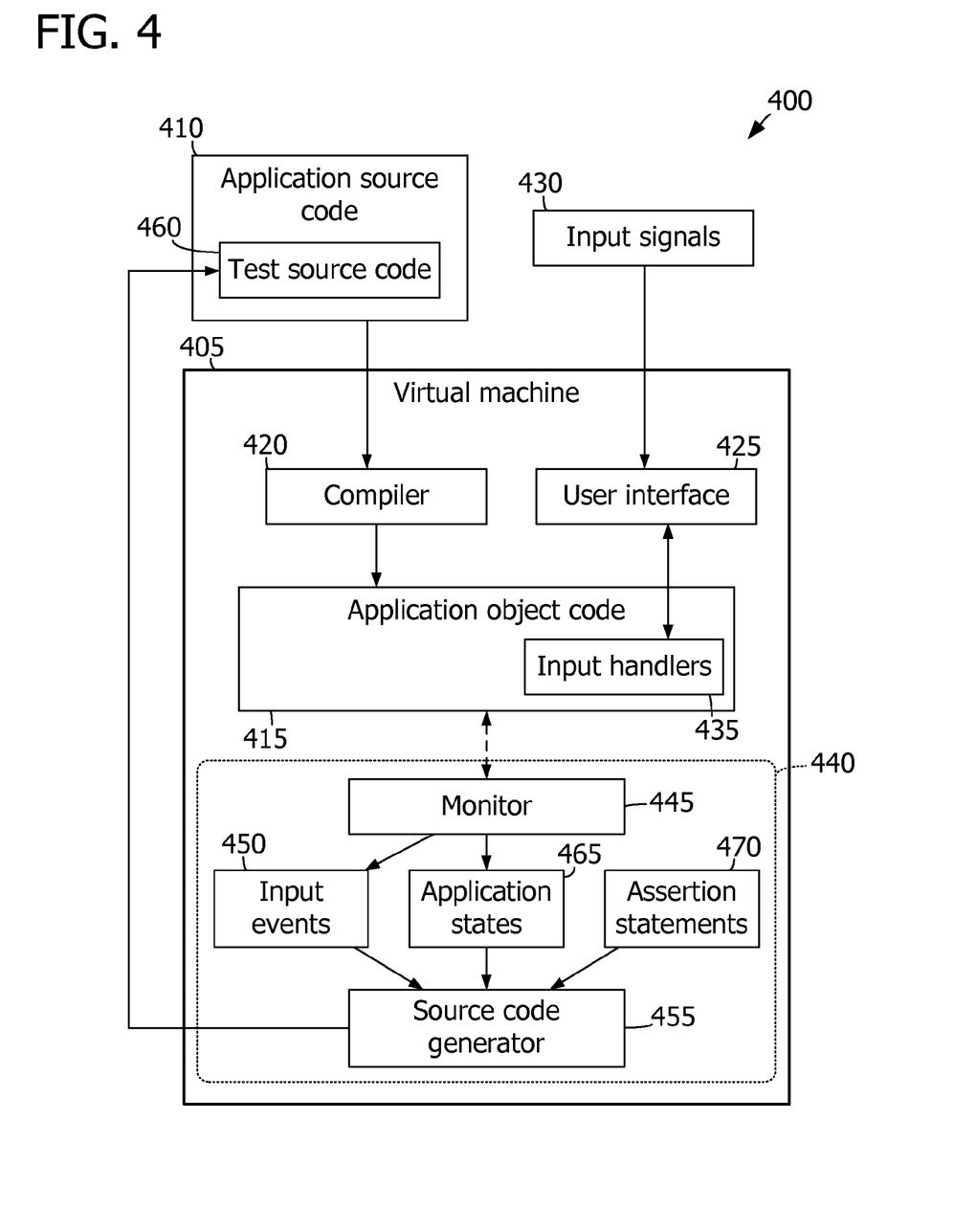
FIG. 4 is an exemplary diagram of data flow that may occur using the method shown in FIG. 3.
Figure 5:
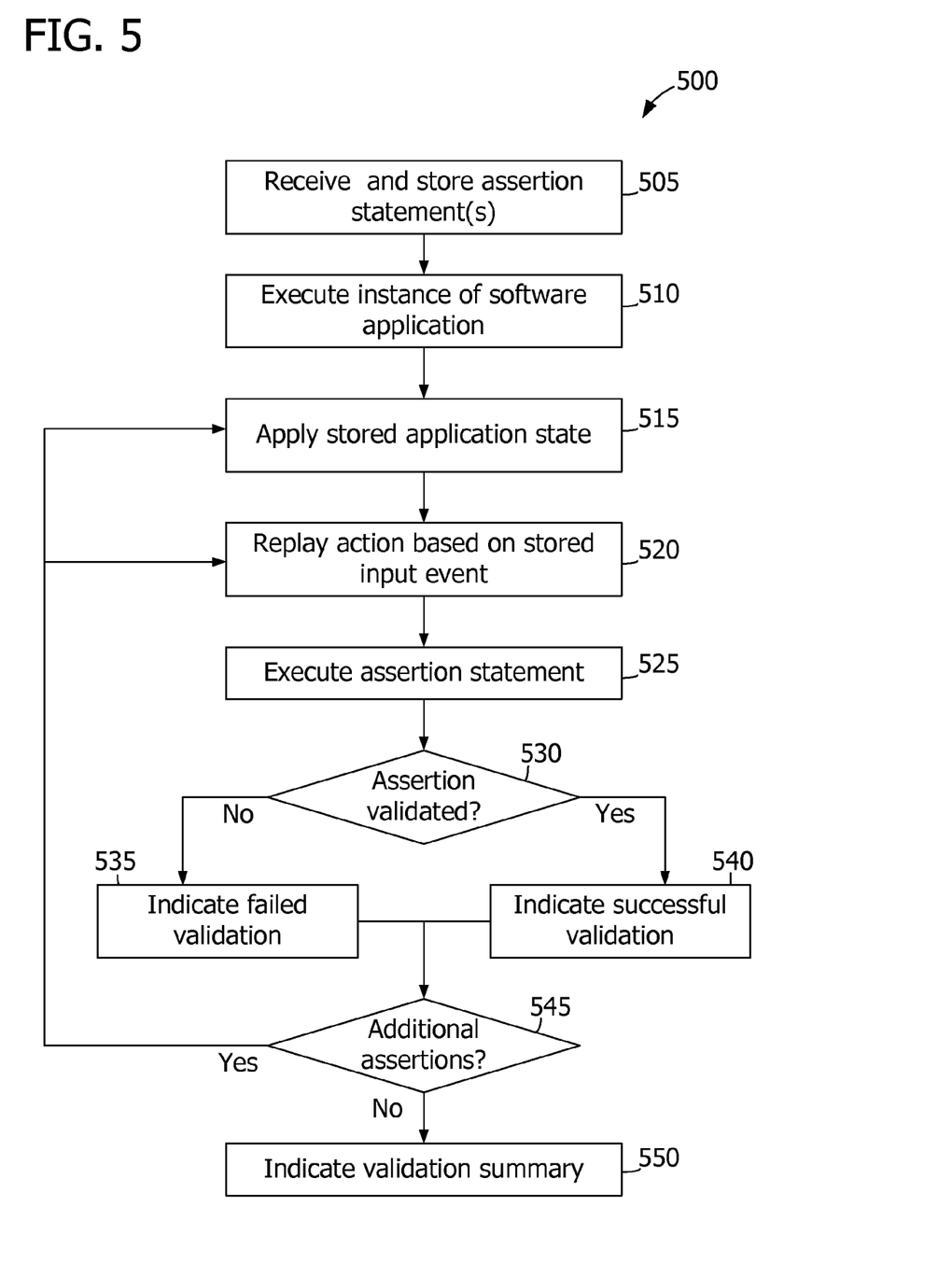
FIG. 5 is a flowchart of an exemplary method that may be used with the method shown in FIG. 3 in validating an operation of the software application.
Figure 9:
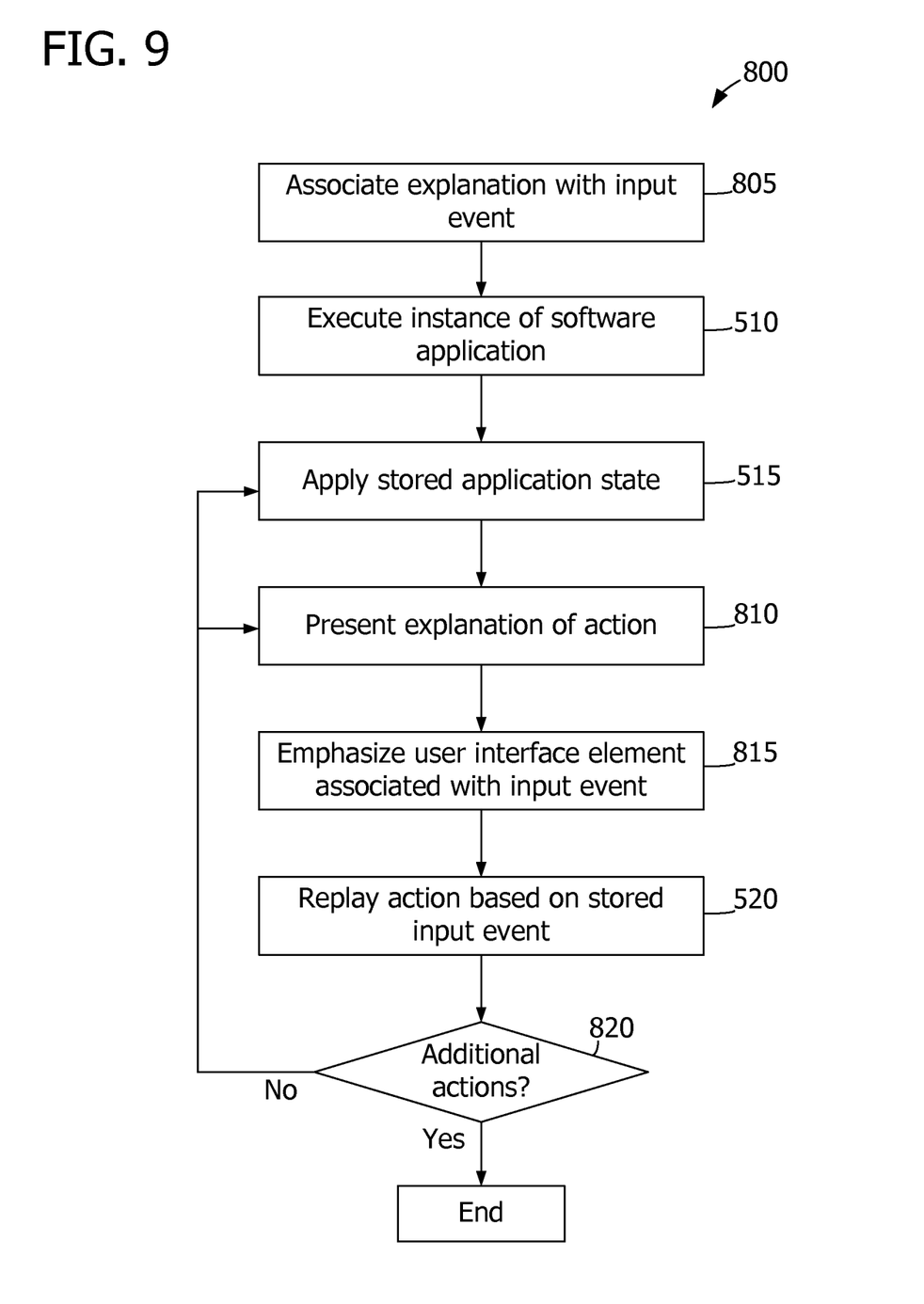
FIG. 9 is a flowchart of an exemplary method that may be used with the method shown in FIG. 3 in demonstrating an operation of the software application.

FIG. 3 is a flowchart of an exemplary method 300 for use in replaying actions performed by a user of a software application. FIG. 4 is an exemplary diagram 400 of a data flow that may occur using method 300. FIGS. 5 and 9 are flowcharts of exemplary methods 500 and 800 for use with method 300 in validating the operation of the software application and demonstrating a use of the software application, respectively.

Portions of method 300 may be performed, for example, using any one of or any combination of computing devices 105 in system 200. In the exemplary embodiment, a software application is executed 305 by a virtual machine 405, which is itself a software application executed by a processor, such as processor 115 (shown in FIG. 1). Accordingly, application object code 415 is executed by the processor, via virtual machine 405.

In the embodiment illustrated in FIG. 4, application source code 410, including a plurality of human-readable statements, is converted into corresponding application object code 415 including a plurality of computer-executable instructions by a compiler 420, which may also be executed by virtual machine 405. Application object code 415 includes instructions that, when executed by virtual machine 405, present a user interface 425. User interface 425 may include, without limitation, a graphical user interface and/or an audible interface (e.g., a voice-operated interface with vocal prompts and voice recognition).

In the exemplary embodiment, a monitoring utility 440 is executed by virtual machine 405. During execution 305 of the software application, monitoring utility 440 receives 310 a request to record user actions. For example the recording request may be received 310 from a user of the software application and/or from a user at a remote computing device. In response to the recording request, a monitor 445 within monitoring utility 440 detects input signals 430 and records input events 450 as described below unless and/or until monitoring utility 440 receives a request to terminate recording of user inputs.

During execution 305 of the software application, an input signal 430 is received 315 from a user input interface. Input signal 430 indicates an action performed by the user. For example, the action may include an engagement of a user interface element, such as, but not limited to, a button or a menu of a graphical user interface. Alternatively, or in addition, the action may include a vocal utterance, such as a spoken command, in a voice-operated interface.

Input signal 430 corresponds to one or more computer-executable instructions, that also correspond to one or more human-readable instructions of application source code 410. For example, one or more software components known as "input handlers" 435 may be included in application object code 415. Input handlers 435 register with user interface 425 to be notified of one or more input signals 430.

Monitor 445 detects inputs processed within application object code 415. For example, prior to, or during, execution 305 of the software application, monitoring utility 440 may modify (e.g., instrument) user interface 425 and/or input handlers 435 to notify monitor 445 when input signals 430 are received 315. In one embodiment, monitor 445 registers itself as an input handler with user interface 425.

Monitor 445 stores 320 an input event 450 associated with the corresponding human-readable statements in a memory device. Input event 450 indicates the action performed by the user, as communicated by input signal 430. For example, input event 450 may include an action type, such as a button press, a touch screen contact, and/or a vocal utterance. Input event 450 may also include details describing the action performed by the user. For example, such details may include a reference to a user interface element engaged by the user and/or a location (e.g., a horizontal or X coordinate and a vertical or Y coordinate) within a graphical user interface 425 at which the user interface element was engaged.

In some embodiments, monitoring utility 440 includes a source code generator 455. Source code generator 455 generates source code such as, but not limited to, test source code 460 including one or more human-readable statements based on one or more input events 450. For example, source code generator 455 may produce application source code 410 that invokes the human-readable statements corresponding to input signal 430.

The computer-executable instructions corresponding to input signal 430 are executed 330 by virtual machine 405, facilitating normal application behavior in addition to the input event recording described herein. In one embodiment, when input signal 430 is received 315, user interface 425 invokes a method of each input handler 435 registered to be notified of input signal 430, thereby executing 330 the computer-executable instructions contained within the method.

Monitor 445 may also store 325 in the memory device an application state 465 representing one or more variables of the software application prior to execution 330 of the computer-executable instructions corresponding to the input signal. For example, application state 465 may represent at least a portion of the state of virtual machine 405, the state of application object code 415, and/or the state of user interface 425.

After executing 330 the computer-executable instructions corresponding to input signal 430, virtual machine 405 determines 335 whether to terminate execution of the software application. For example, virtual machine 405 may determine 335 that the software application is to be terminated when a termination request is received (e.g., as an input signal 430). If virtual machine 405 determines 335 not to terminate the software application, execution 305 continues, and virtual machine 405 receives 315 another input signal.

Figure 6:
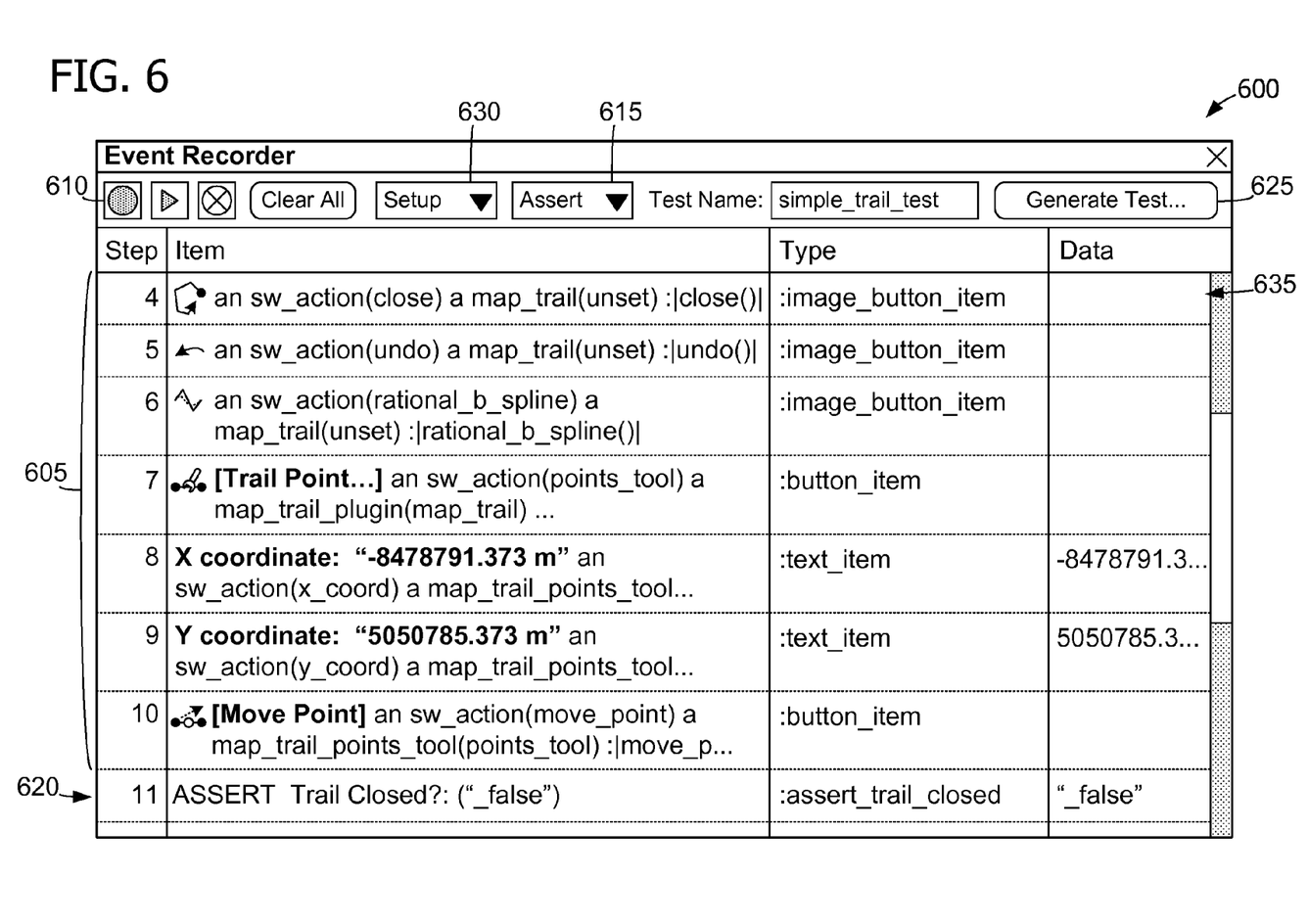
FIG. 6 is an exemplary user interface for storing input events and receiving assertion statements.
Figure 7A:
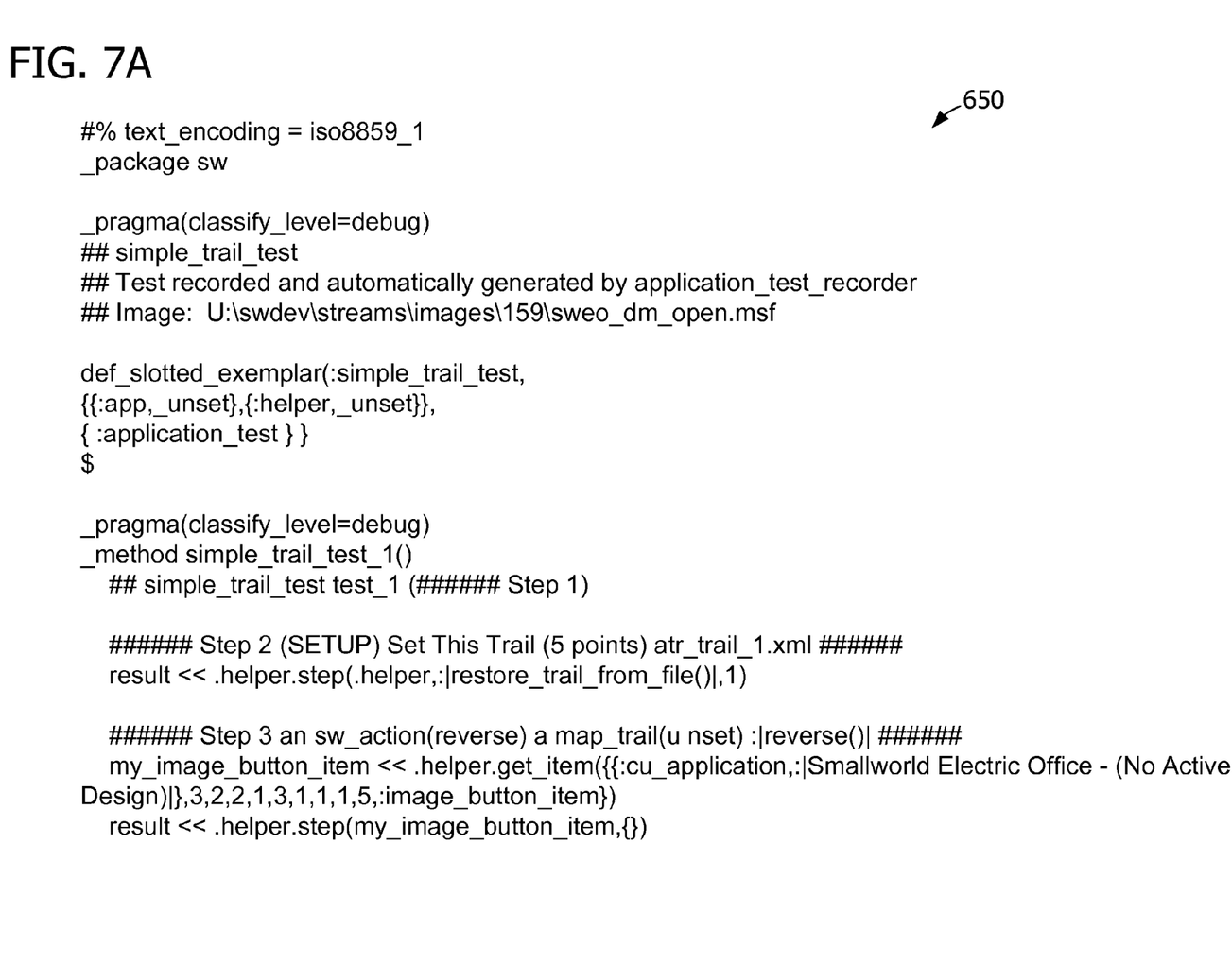
FIGS. 7A and 7B are an exemplary code listing of test source code that may be generated using the user interface shown in FIG. 6.
Figure 7B:
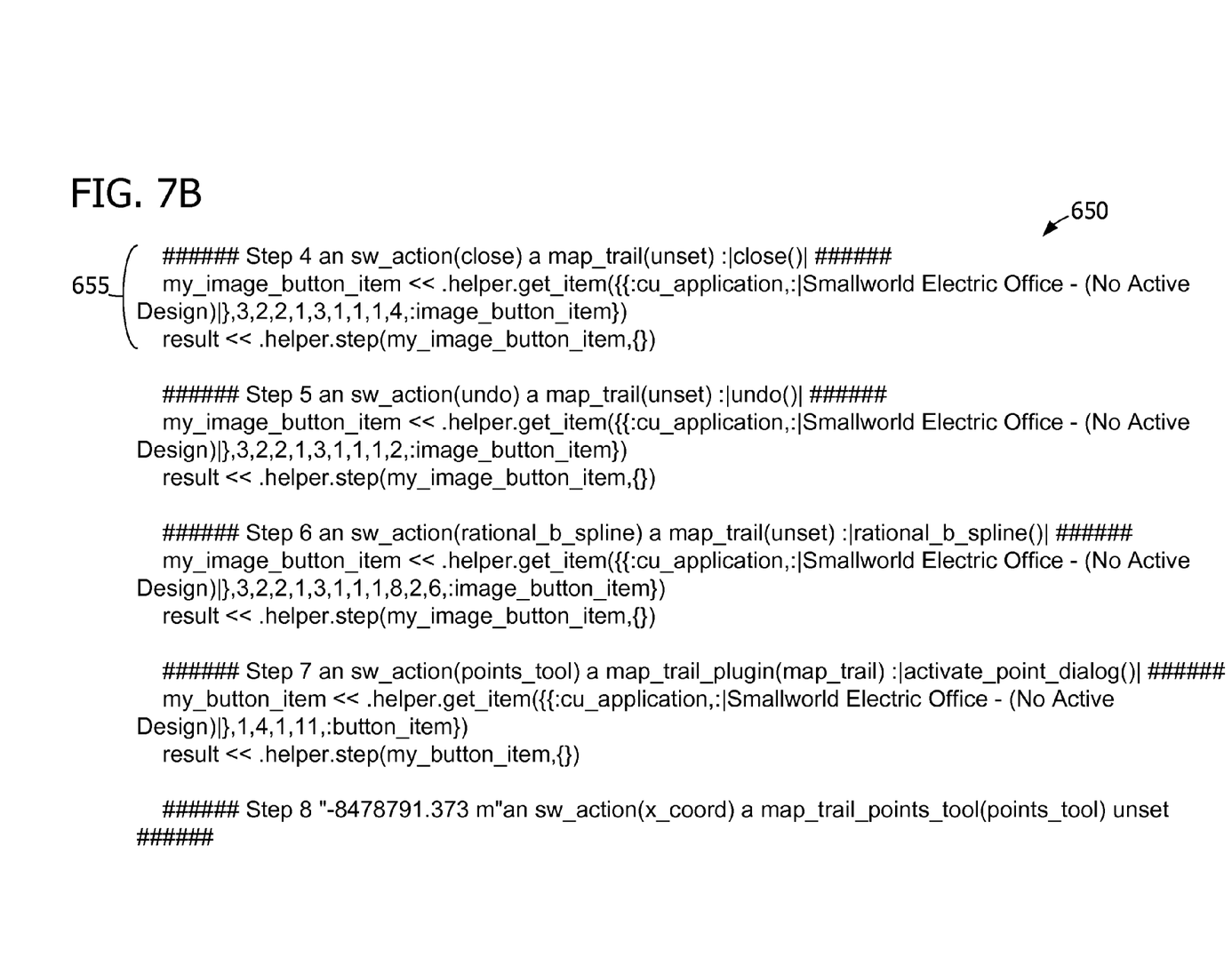
Figure 8:
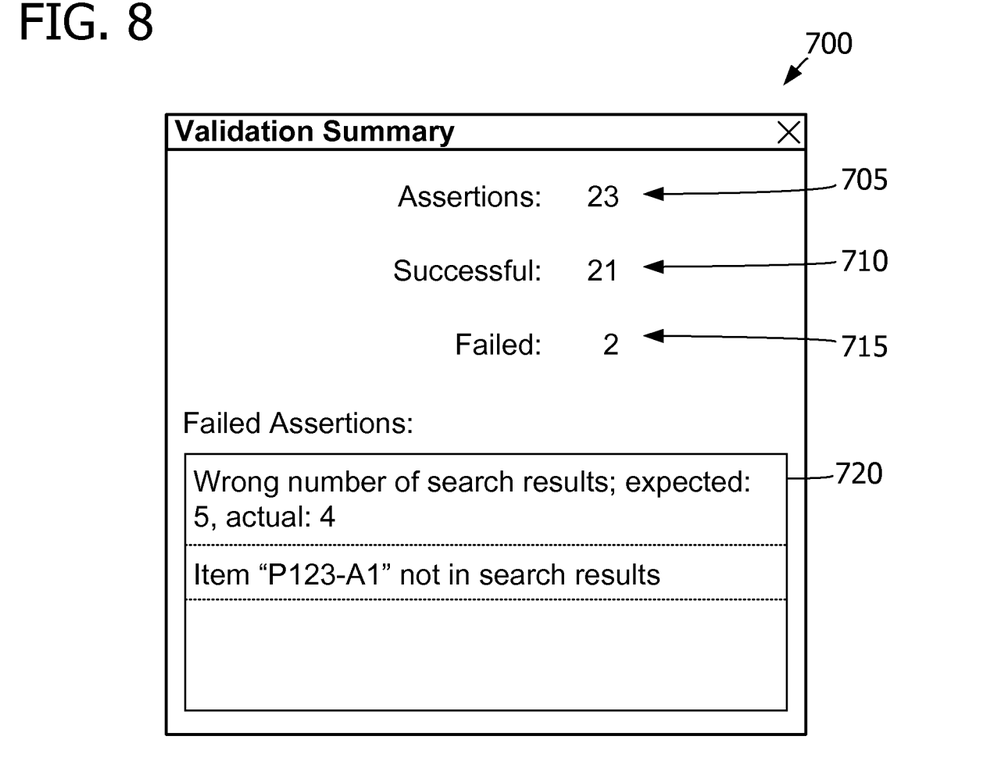
FIG. 8 is an exemplary user interface for indicating a validation summary of a software application.

FIG. 5 is a flowchart of an exemplary method 500 that may be used with method 300 in validating an operation of the software application. FIG. 6 is an exemplary user interface 600 for use in storing input events 450 (shown in FIG. 4) and receiving assertion statements 470 (also shown in FIG. 4). FIGS. 7A and 7B are an exemplary code listing of test source code that may be generated using user interface 600. FIG. 8 is an exemplary user interface 700 for indicating a validation summary of a software application.

In the exemplary embodiment, monitoring utility 440 (shown in FIG. 4) receives and stores 505 in a memory device, such as memory device 110 (shown in FIG. 1), one or more assertion statements 470. When executed, an assertion statement 470 produces a validation result (e.g., a successful validation or a failed validation) indicating a validity of the software application. For example, assertion statement 470 may test that an actual condition, value, and/or output of the software application is equal to an expected condition, value, and/or output based on one or more predetermined inputs.

In the exemplary embodiment, assertion statements 470 are received and/or stored via user interface 600, that is presented by monitoring utility 440 (e.g., monitor 445). User interface 600 includes a sequence of input events 605 recorded based on input to user interface 425 (shown in FIG. 4). In one embodiment, a user submits a recording request by executing user interface 600 and/or by selecting a record button 610. In response to receiving 310 (shown in FIG. 3) the recording request, monitoring utility 440 captures input events 450, such as input events 605, and displays them in user interface 600.

User interface 600 also includes an assertion statement option 615. When a user selects assertion statement option 615, monitoring utility 440 prompts the user to enter assertion information, such as the assertion statement and an expected condition, value, and/or output. In the exemplary embodiment, user interface 600 includes an assertion statement 620, that is indicative that a trail of points in a diagram is expected to not be closed after performance of input events 605. In some embodiments, the condition, value, and/or output, such as the state of the trail (i.e., whether closed or not), is not presented by or otherwise directly available from user interface 425. Unlike testing methods that interact only with user interface 425, embodiments described herein enable testing such values within the scope of application object code 415 (shown in FIG. 4).

In one embodiment, monitoring utility 440 generates test source code 460 (shown in FIG. 4) based at least in part on one or more input events 450, one or more application states 465 (also shown in FIG. 4), and one or more assertion statements 470. In the exemplary embodiment, user interface 600 includes a test code generation button 625. In response to a user selecting test code generation button 625, monitoring utility 440 generates test source code 460 based at least in part on input events 605, assertion statement 620, and/or an application state 465, if saved. Application state 465 may be saved by monitoring utility 440, for example, upon receiving 310 the recording request and/or in response to the user selecting a setup option 630.

FIGS. 7A and 7B are each an exemplary code listing 650 of test source code 460 that may be generated by monitoring utility 440 based on input events 605 and assertion 620. Once generated, test source code 460 such as that shown in code listing 650 may be modified and/or extended by an application developer. For example an application developer may insert additional assertion statement into generated source code 460.

As illustrated in user interface 600 (shown in FIG. 6), multiple input events 450 and/or assertion statements 470 may be associated with a single application state 465. In some embodiments, each input event 450 and/or assertion statement 470 is associated with one or more human-readable statements in test source code 460. For example, a sequence of input events 450 and/or assertion statements 470 may be encoded as human-readable statements, such as those in code listing 650. Moreover, as shown in code listing 650, portions of generated test source code 460 correspond to input events 605. For example, a fourth step portion 655 within code listing 650 corresponds to a fourth step input event 635 in user interface 600.

An instance of the software application is executed 510 (e.g., using virtual machine 405). If previously stored 325 (shown in FIG. 3), application state 465 is applied 515 to the instance of the software application to achieve a desired pretest state. More specifically, applying 515 application state 465 may restore the software application, virtual machine 405, and/or user interface 425 to the state in which they existed when input signal 430 was previously received 315 (shown in FIG. 3).

The recorded action is replayed 520 based on input event 450. For example, if input event 450 is associated with generated source code 410, object code 415 based on (e.g., compiled from and/or translated from) generated source code 410 may be executed by virtual machine 405 to replay 520 the action.

In addition to, or alternatively to, the recorded action may be replayed 520 by performing actions within user interface 425. For example, input event 450 may include an action type and/or details describing an engagement of user interface 425 by the user, and an action may be automatically performed based on such an action type and/or details.

Assertion statement 470 is executed 525, producing a validation result, such as a successful validation or a failed validation. The validation result is checked 530. If the validation fails, a failed validation is indicated 535. For example, an indication 535 of a failed validation may include, but is not limited to including, incrementing a quantity of failed validations, indicating an error via a presentation interface, and/or storing details about the failed validation (e.g., an expected condition, value, and/or output and an actual condition, value, and/or output) in a memory device. If the validation succeeds, a successful validation is indicated 540, such as by incrementing a quantity of successful validations.

Virtual machine 405 determines 545 whether any assertions remain to be executed. If there are remaining assertion statements 470 corresponding to application state 465, method 500 continues with replaying 520 a remaining action, if any, and executing 525 the remaining assertion. If no assertion statement 470 corresponding to application state 465 remains, method 500 continues with applying 515 another application state 465.

When no assertions remain, virtual machine 405 may indicate 550 a validation summary. In one embodiment, the summary is stored in a memory device and/or transmitted to another computing device (e.g., as a validation notification message and/or an email message). In another embodiment, a summary (e.g., a quantity) of failed validations and successful validation is indicated 550 via a presentation interface.

In some embodiments, application state 465, input events 450, and/or assertion statements 470 are associated with a defect and/or an anomaly within the software application. For example, user interface 600 may be integrated with a defect reporting system, and one or more assertion statements 470 may be used to demonstrate expected and actual behavior relevant to a defect.

FIG. 8 is an exemplary user interface 700 for indicating a validation summary of a software application. In the exemplary embodiment, assertion statements have been executed against an item search feature within a software application. User interface 700 includes a total assertion statement quantity 705, a successful validation quantity 710, and a failed validation quantity 715. Details about failed validations are displayed in a failed validation portion 720.

Figure 10:
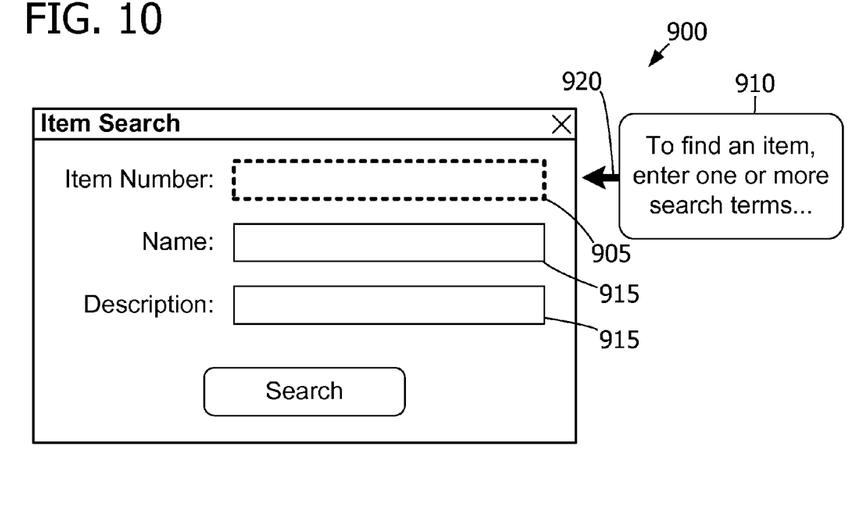
FIGS. 10 and 11 are an exemplary user interface used in connection with the method shown in FIG. 9.
Figure 11:
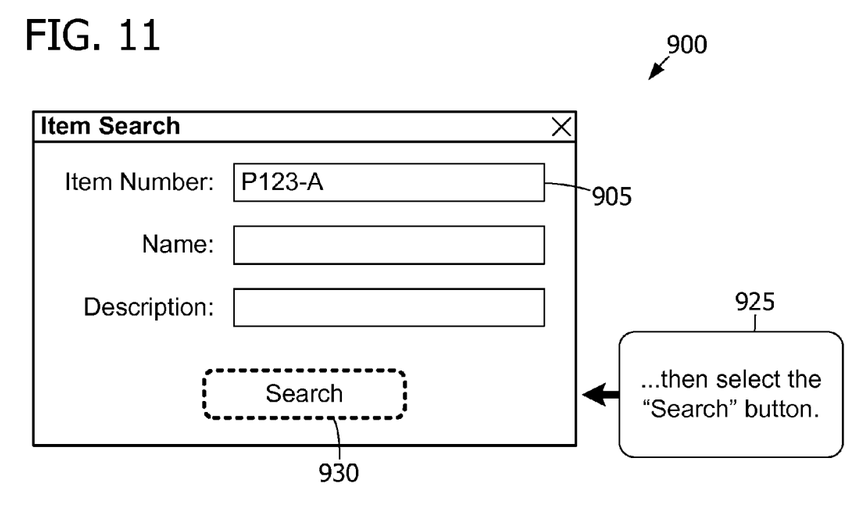

FIG. 9 is a flowchart of an exemplary method 800 for use with method 300 (shown in FIG. 3) in demonstrating an operation of the software application. FIGS. 10 and 11 are an exemplary user interface 900 used in connection with method 800.

In the exemplary embodiment, an explanation is associated 805 with input event 450 (shown in FIG. 4). For example, the explanation may include instructive text, such as a description of the action and/or operation to be demonstrated.

As in method 500 (shown in FIG. 5), an instance of the software application is executed 510 by virtual machine 405 (shown in FIG. 4), and an application state 465 (also shown in FIG. 4), if any, is applied 515. The explanation of the action is presented 810 via a presentation interface. For example, if user interface 425 (shown in FIG. 4) is a graphical user interface, the explanation may be displayed adjacent to or within user interface 425.

In the exemplary embodiment, user interface 900 enables a user to search for an item within the software application. User interface 900 includes search criteria fields, such as an item number field 905. Displayed adjacent to user interface 900 is an explanation balloon 910. Explanation balloon 910 includes instructions for performing a search. In the exemplary embodiment, a search is performed based on an item number. More specifically, while actions within user interface 900 were previously being recorded, the user entered a value in item number field 905, and input event 450 representing this value entry was created. The content of explanation balloon 910 was associated 805 with input event 450.

In some embodiments, a user interface element associated with input event 450 is emphasized 815 within user interface 425. For example, a user interface element in a graphical user interface may be emphasized by graphical distinction. Graphical distinction may be accomplished by applying a pattern (e.g., a line pattern or a background pattern), a color (e.g., a background color or a foreground color), a line weight, a typeface, a font weight, an animation (e.g., fading and/or blinking), a proximately positioned icon, and/or any other suitable means for distinguishing graphical elements from one another. Moreover, human-readable statements for providing such emphasis may be produced automatically by source code generator 455 (shown in FIG. 4) based on input event 450.

In the exemplary embodiment, input event 450 is associated with item number field 905, and item number field 905 is graphically distinguished from one or more other user interface elements and/or from item number field 905 in a non-emphasized state. Specifically, item number field 905 is graphically distinguished with a line weight and a line pattern that differ from those displayed for non-emphasized input fields 915. In addition, explanation balloon 910 includes an arrow 920 directed toward item number input field 905.

The action associated with input signal 430 (shown in FIG. 4) is replayed 520 based on input event 450. The software application responds to replaying 520 the action, such that the operation is demonstrated to a user. In the exemplary embodiment, replaying 520 input event 450 includes entering the value "P123-A" into item number field 905, as shown in FIG. 11.

Some embodiments facilitate demonstrating multiple operations within user interface 425. In such an embodiment, virtual machine 405 determines 820 whether additional actions remain to be replayed 520. For example, a sequence of input events 450, one or more of which is associated 805 with an explanation, may be replayed 520. Input events 450 may correspond to a single application state 465 or multiple application states 465.

If an action associated with application state 465 remains, method 800 continues with presenting 810 an explanation of the action, if any, and replaying 520 the action. If no action associated with application state 465 remains, method 800 continues with applying another application state 465.

In the exemplary embodiment, after replaying 520 a first input event 450 by entering "P123-A" into item number field 905, explanation balloon 910 is dismissed, item number field 905 is de-emphasized, and a second explanation balloon 925 is presented 810. Explanation balloon 925 informs the user that a search can be performed by selecting a search button 930, that is now emphasized 815. The search operation is replayed 520 by selecting search button 930, and the results of the search are displayed to the user.

Embodiments provided herein enable automated recording and replaying of actions initiated by a user in a software application. Unlike existing methods for replaying user actions, the methods described herein are capable of operating within the scope of application object code, such that data structures underlying a user interface may be queried, manipulated, and/or tested. Moreover, input events described herein are operable to replay user-initiated actions even when a user interface is modified or a new user interface is created. By capturing a state of the application prior to user actions, setup time for replaying such actions may be significantly reduced. In addition, operation of the application may be demonstrated for a user by presenting explanations along with the user interface while actions are replayed.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention may be practiced with modification within the spirit and scope of the claims.

What is claimed is:

1. A system for use in replaying events initiated by a user of a software application, said system comprising:
    a memory device configured to store a plurality of computer-executable instructions;
    a user input interface configured to produce an input signal based on an action performed by the user; and
    a processor coupled in communication with the memory device and the user input interface, said processor programmed to:
        execute one or more computer-executable instructions of the plurality of computer-executable instructions, wherein the one or more computer-executable instructions correspond to the input signal and to one or more human-readable statements;
        store, in said memory device, an input event associated with the one or more human-readable statements, wherein the input event is operable to replay the action performed by the user;
        generate test code including at least one assertion statement that, when executed, tests that at least one of a condition, a value, and an output is equal to at least one of an expected condition, an expected value, and an expected output; and
        execute the at least one assertion statement.

2. A system according to claim 1, wherein said processor is further programmed to generate application source code including one or more human-readable statements based on the stored input events.

3. A system according to claim 1, wherein said processor is further programmed to:
    generate computer-executable instructions based on the input event; and
    execute the generated computer-executable instructions to replay the action performed by the user.

4. A system according to claim 1, wherein said processor is further programmed to generate test code including at least one assertion statement by additionally receiving user input specifying the at least one of a condition, a value, and an output to test, and the at least one of a predefined condition, a predefine value, and a predefined output.

5. A system according to claim 1, wherein said memory device is further configured to store a defect report associated with the assertion statement.

6. A system according to claim 1, wherein said memory device is further configured to store an application state representing one or more variables of the software application prior to execution of the computer-executable instructions corresponding to the input signal.

7. A system according to claim 6, wherein said processor is further programmed to:
    generate computer-executable instructions based on the input event;
    execute an instance of the software application;
    apply the stored application state to the instance of the software application; and
    execute the generated computer-executable instructions to replay the action performed by the user.

8. A system according to claim 1, wherein said processor is further programmed to associate the input event with at least one of the action performed by the user and the input signal.

9. A system according to claim 1, further comprising a presentation interface configured to present a prompt to the user, wherein the input signal produced by said input interface indicates a response to the prompt.

10. A system according to claim 1, wherein the user input interface is further configured to produce a plurality of input signals based on a plurality of actions performed by the user, and the processor is further programmed to:
    execute one or more computer-executable instructions corresponding to the input signal and to one or more human-readable statements for each input signal of the plurality of input signals; and
    store in the memory device an input event associated with the one or more human-readable statements for each input signal of the plurality of input signals.

11. A method for use in replaying actions performed by a user of a software application, said method comprising:

receiving from a user input interface an input signal indicating an action performed by the user;

executing by a processor one or more computer-executable instructions corresponding to the input signal;

storing in a memory device an input event associated with the one or more human-readable statements, wherein the input event is operable to replay the action performed by the user;

storing in the memory device an application state representing one or more variables of the software application prior to execution of the computer-executable instructions corresponding to the input signal;

generating, by the processor, test code including at least one assertion statement that, when executed, tests that at least one of a condition, a value, and an output is equal to at least one of an expected condition, an expected value, and an expected output; and executing, by the processor, the at least one assertion statement.

12. A method according to claim 11, further comprising:
executing an instance of the software application;
applying the stored application state to the instance of the software application; and
replaying the action performed by the user based on the stored input event.

13. A method according to claim 12, wherein storing the input event associated with the one or more human-readable statements comprises generating source code invoking the human-readable statements, and replaying the action comprises executing object code generated based on the generated source code.

14. A method according to claim 12, further comprising demonstrating an operation of the software application by replaying the action performed by the user.

15. A method according to claim 14, further comprising, prior to replaying the action, presenting an explanation of the action.

16. A method according to claim 14, further comprising emphasizing a user interface element associated with the input event.

17. A method according to claim 11, wherein:
generating, by the processor, test code including at least one assertion statement further comprises receiving user input specifying the at least one of a condition, a value, and an output to test, and the at least one of a predefined condition, a predefine value, and a predefined output.

18. A method according to claim 11, further comprising storing in the memory device a plurality of input events indicating a plurality of actions performed by the user, wherein each input event of the plurality of input events is associated with one or more human-readable statements.

19. A method according to claim 11, wherein storing an input event comprises storing a location within a graphical user interface at which a user interface element was engaged by the user.

20. One or more computer-readable storage media having computer-executable instructions embodied thereon, wherein when executed by at least one processor, the computer-executable instructions cause the at least one processor to:

receive an input signal indicating an action performed by the user;

execute one or more computer-executable instructions corresponding to the input signal and to one or more human-readable statements;

store an input event associated with the one or more human-readable statements, wherein the input event is operable to replay the action performed by the user;

generate test code including at least one assertion statement that, when executed, tests that at least one of a condition, a value, and an output is equal to at least one of an expected condition, an expected value, and an expected output; and execute the at least one assertion statement.

* * * * *